UNITED STATES PATENT OFFICE.

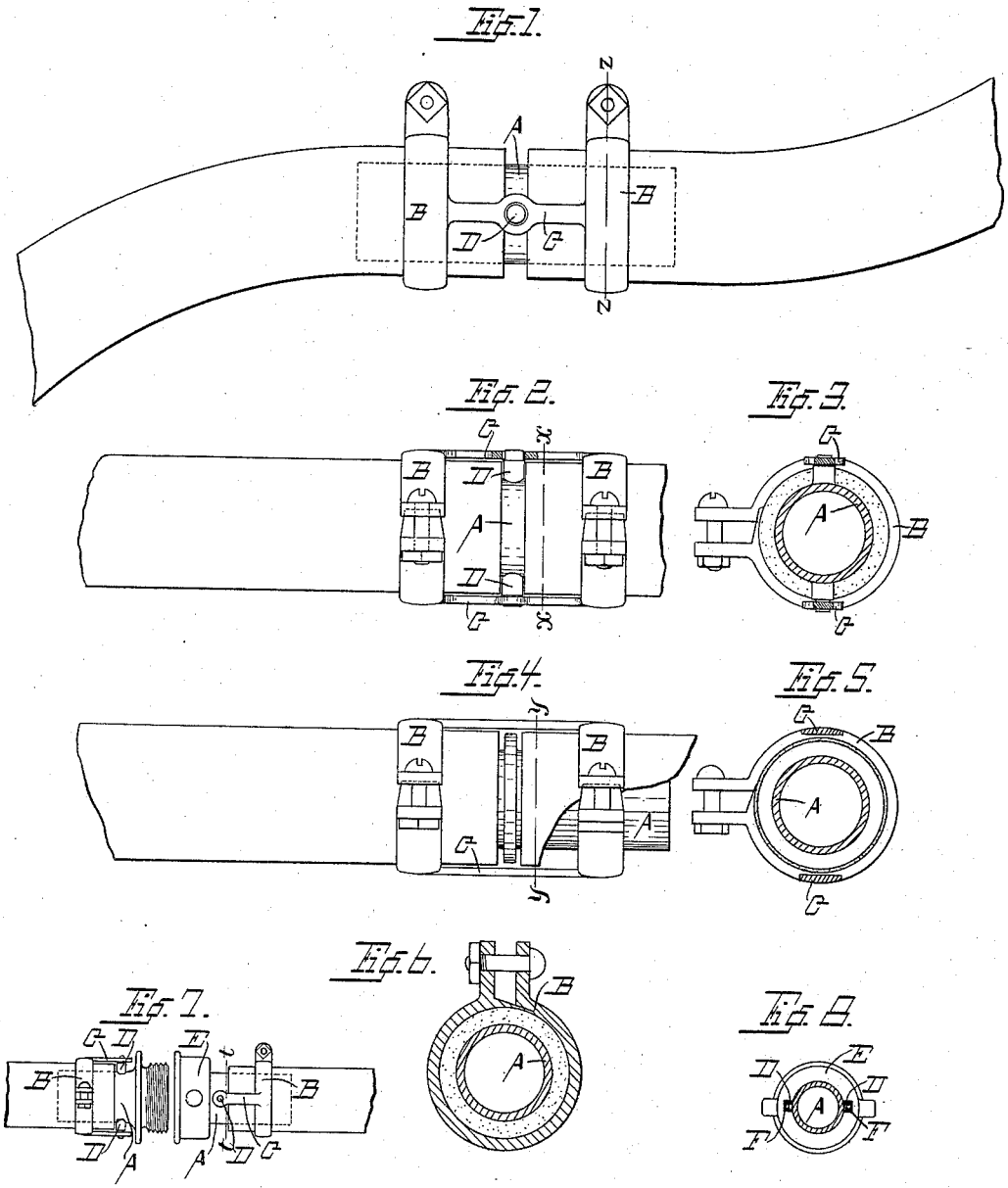

CHARLES A. WOOD, OF MILWAUKEE, WISCONSIN.

HOSE-COUPLING.

SPECIFICATION forming part of Letters Patent No. 609,488, dated August 23, 1898.

Application filed May 17, 1897. Serial No. 636,830. (No model.)

*To all whom it may concern:*

Be it known that I, CHARLES A. WOOD, a citizen of the United States, residing at Milwaukee, in the county of Milwaukee and State of Wisconsin, have invented new and useful Improvements in Hose-Couplings, of which the following is a specification.

My invention relates to improvements in that class of hose-couplings in which the meeting ends of the hose are bound to the respective ends of an interior thimble by means of exterior clamps. A difficulty has heretofore been experienced with this class of couplings owing to the tendency of the clamp and hose to slip from the thimble when subject to the pressure of the water. It has been attempted to obviate this difficulty by corrugating the interior thimble, but with little success, as the rubber gives sufficiently to escape the corrugations, and the clamp, being free to follow the movement of the rubber, does not resist its longitudinal movement. The object of my invention is to overcome this difficulty by providing a form of clasp which will not slip longitudinally of the thimble and will therefore coöperate with the thimble in retaining the rubber by its frictional contact.

In the following description reference is had to the accompanying drawings, in which—

Figure 1 is a side view of my invention as it is applied for coupling sections of broken hose or hose not provided with the usual end-coupling members. Fig. 2 is a top view of the same. Fig. 3 is a section view drawn on the line $x\, x$ of Fig. 2. Fig. 4 is a top view showing a modified form of my coupling. Fig. 5 is a section view drawn on the line $y\, y$ of Fig. 4. Fig. 6 is a section view drawn through the clamp on the line $z\, z$ of Fig. 2. Fig. 7 is a side view of my invention as it is applied to the respective members of a metallic coupling-joint, the respective members of which are commonly inserted in the ends of the hose-sections. Fig. 8 is a cross-section view drawn on the line $t\, t$ of Fig. 7.

Like parts are identified by the same reference-letters throughout the several views.

An interior thimble A, either corrugated or otherwise formed, is provided with exterior hose-engaging clamps B, connected together by arms C, one on each side. The arms are provided with apertures in their central portions, in which studs D, projecting from the thimble A, are engaged, the clamps being thus permanently secured to each other and to the interior thimble. The arms C are permitted to rock upon the studs D when the hose is not engaged by the clamps, thus facilitating the insertion of the hose between the clamps and the interior thimble, as the clamp may be rocked upon its supporting-arms to form a wide opening at one side, in which the edge of the hose is first partially inserted, when the entire end portion is easily forced under the clamp by simultaneously pressing and twisting the same.

Where the coupling is used for permanently uniting the hose-sections, a single thimble is used, with clamps at each end for the respective sections, which are preferably connected together and attached to the same studs projecting from the hose-sections, as best shown in Figs. 1 and 2. If desired, however, the studs may be omitted from this form of coupling and the clamps merely connected together, as best shown in Fig. 4. In the form of coupling shown in Fig. 7 the screw-threaded coupling-thimble E is recessed at F F to permit it to slip over the studs D, which pivotally engage the clamp-arms C, thus enabling me to use my invention in permanently attaching the respective members of the coupling to the hose-sections.

The object of the pivotal or loose-joint attachment of the clamp to the coupling-thimble is to facilitate the insertion of the hose under the clamp and also to permit the clamp to be drawn tightly around the hose and adjusted thereon without cramping the holding-arms.

Having thus described my invention, what I claim as new, and desire to secure by Letters Patent, is—

In a hose-coupling, the combination of the interior thimble provided with projecting studs, and a pair of exterior hose-retaining clamps, connected together by a pair of arms, and to the interior thimble by studs projecting therefrom and engaged in apertures in said arms, substantially as described.

In testimony whereof I affix my signature in the presence of two witnesses.

CHARLES A. WOOD.

Witnesses:
JAS. B. ERWIN,
L. P. WHEELER.